(12) United States Patent
Sasaki et al.

(10) Patent No.: US 9,151,655 B2
(45) Date of Patent: Oct. 6, 2015

(54) OIL LEVEL GAUGE STRUCTURE

(71) Applicant: HONDA MOTOR CO., LTD., Tokyo (JP)

(72) Inventors: Rei Sasaki, Wako (JP); Takashi Okamoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 290 days.

(21) Appl. No.: 13/847,394

(22) Filed: Mar. 19, 2013

(65) Prior Publication Data

US 2013/0255372 A1   Oct. 3, 2013

(30) Foreign Application Priority Data

Mar. 30, 2012 (JP) ................. 2012-080233

(51) Int. Cl.
   *G01F 23/00* (2006.01)
   *G01F 23/04* (2006.01)

(52) U.S. Cl.
   CPC ............. *G01F 23/00* (2013.01); *G01F 23/04* (2013.01)

(58) Field of Classification Search
   None
   See application file for complete search history.

(56) References Cited

U.S. PATENT DOCUMENTS 4,055,898 A * 11/1977 Braun et al. .................... 33/717

FOREIGN PATENT DOCUMENTS

| JP | 09170422 A | * | 6/1997 |
| JP | 09209736 A | * | 8/1997 |
| JP | 10212921 A | * | 8/1998 |
| JP | 2002071425 A | * | 3/2002 |
| JP | 2002339722 A | * | 11/2002 |
| JP | 2008-38655 A | | 2/2008 |
| JP | 2012107518 A | * | 6/2012 |
| KR | 100780378 B1 | * | 11/2007 |

* cited by examiner

*Primary Examiner* — Andre Allen
(74) *Attorney, Agent, or Firm* — Birch, Stewart, Kolasch & Birch, LLP

(57) ABSTRACT

An oil level gauge structure with an oil level gauge attachment hole functioning as an oil filling opening provided in a casing of an engine with an oil level gauge for closing up the attachment hole. The oil level gauge has a columnar portion formed on the lower end side of an external thread. The columnar portion has a predetermined length and is continuous with the external thread for attaching the oil level gauge to the casing. A guide hole into which the columnar portion is fitted to restrict the position of the columnar portion is provided on the lower end side of an internal thread of an attachment hole of the casing. The columnar portion of the oil level gauge is formed to have such an axial length that the lower end of the columnar portion exceeds the depth of the internal thread of the casing.

18 Claims, 6 Drawing Sheets

OIL LEVEL GAUGE STRUCTURE

CROSS-REFERENCE TO RELATED APPLICATIONS

The present application claims priority under 35 USC 119 to Japanese Patent Application No. 2012-080233 filed Mar. 30, 2012 the entire contents of which are hereby incorporated by reference.

BACKGROUND OF THE INVENTION

1. Field of the Invention

The present invention relates to an oil level gauge structure.

2. Description of Background Art

A conventional oil level gauge is attached to an upper portion of the crankcase cover, which necessitates an oil level gauge that is long and large. In addition, since the conventional gauges are configured such that their gauge section is guided, the length of shaft portion of the conventional gauge needs to be increased accordingly. See, for example, Japanese Patent Laid-Open No. 2008-38655.

SUMMARY AND OBJECTS OF THE INVENTION

The present invention provides a small-sized oil level gauge.

According to an embodiment of the present invention, the above-identified problem is solved by providing an oil level gauge structure having an oil level gauge attachment hole (14) that doubles as an oil filling opening provided in a casing (7) of an engine (2) with an oil level gauge (1) closing up the attachment hole (14). The oil level gauge (1) has a columnar portion (26) formed on the lower end side of an external thread (24) with the columnar portion (26) having a predetermined length and continuing into the external thread (24) to be adapted to attach the oil level gauge (1) to a casing (7). A guide hole (27) in which the columnar portion (26) is provided is fitted to restrict the positioning of the columnar portion (26) on the lower end side of an internal thread (25) of the attachment hole (14) of the casing (7).

According to an embodiment of the present invention, the columnar portion (26) of the oil level gauge (1) is formed to have an axial length (35) wherein a lower end (39) of the columnar portion exceeds a depth (36) of the internal thread of the casing (7).

According to an embodiment of the present invention, the oil level gauge (1) is provided with an inclining guide portion (30) with a width that gradually increases from the gauge section (31) located at a leading end thereof to the external thread (24).

According to an embodiment of the present invention, the gauge section (31) is cylindrical or columnar.

According to an embodiment of the present invention, the oil level gauge attachment hole (14) in the casing (7) is located at a lower corner portion of a cover member (9) for covering an internal rotating body (21).

According to an embodiment of the present invention, the casing (7) is a clutch cover portion (9) that covers a side of a clutch as the internal rotating body (21) and the oil level gauge (1) is disposed obliquely so as to have an outer end located inside the vehicle-outside end of the clutch cover portion (9).

According to an embodiment of the present invention, the oil level gauge (1) is installed between a kick starter shaft (11) and the rotating body (21) as viewed from a side of the vehicle.

According to an embodiment of the present invention, the oil level gauge (1) is disposed in a space between a sub-frame (38) vertically extending behind the engine (2) and a clutch cover portion (9) tilting rearwardly and downwardly.

According to an embodiment of the present invention, the columnar portion (26) formed continuously with the external thread (24) of the oil level gauge (1) is provided at a position corresponding to the guide hole (27) located on the lower end side of the internal thread (25) of the casing (7). Therefore, the enlargement of the oil level gauge for guiding the oil level gauge can be reduced. Further, even if the oil level gauge (1) has a short overall length, an error in the measurement of the oil level can be reduced.

According to an embodiment of the present invention, the enlargement of the oil level gauge (1) for guidance thereof can be reduced. An error in the measurement of the oil level can be reduced using an oil level gauge having a shorter overall length.

According to an embodiment of the present invention, the inclining guide portion (30) ensures smooth movement of the oil level gauge (1) into the guide hole (27).

Therefore, work efficiency for checking the oil level at such timing as oil replacement can be enhanced.

According to an embodiment of the present invention, the orientation of the gauge section (31) with respect to the position of the oil level gauge 1 in its turning direction can be eliminated, thereby improving measurement accuracy.

According to an embodiment of the present invention, bringing the oil level gauge (1) close to the rotating body (21) can prevent the oil level gauge (1) from protruding from the casing (7).

According to an embodiment of the present invention, while the oil level gauge (1) is disposed inward of the clutch cover portion (9), the accuracy of oil level measurement can be ensured. Thus, downsizing of the engine (2) and an improvement in ease of maintenance can be achieved.

According to an embodiment of the present invention, the oil level gauge (1) is disposed at the cover concave portion (37) near the kick starter shaft (11) while avoiding the turning trajectory of the kick arm (13). While enhancing the external appearance, the kick starter shaft (11) can optimally be disposed. Thus, an improvement in the operability of the kick arm (13) can be achieved.

According to an embodiment of the present invention, the wide space resulting from the inclination of the sub-frame (38) can be utilized. Therefore, maintenance performance is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

Figure 1:
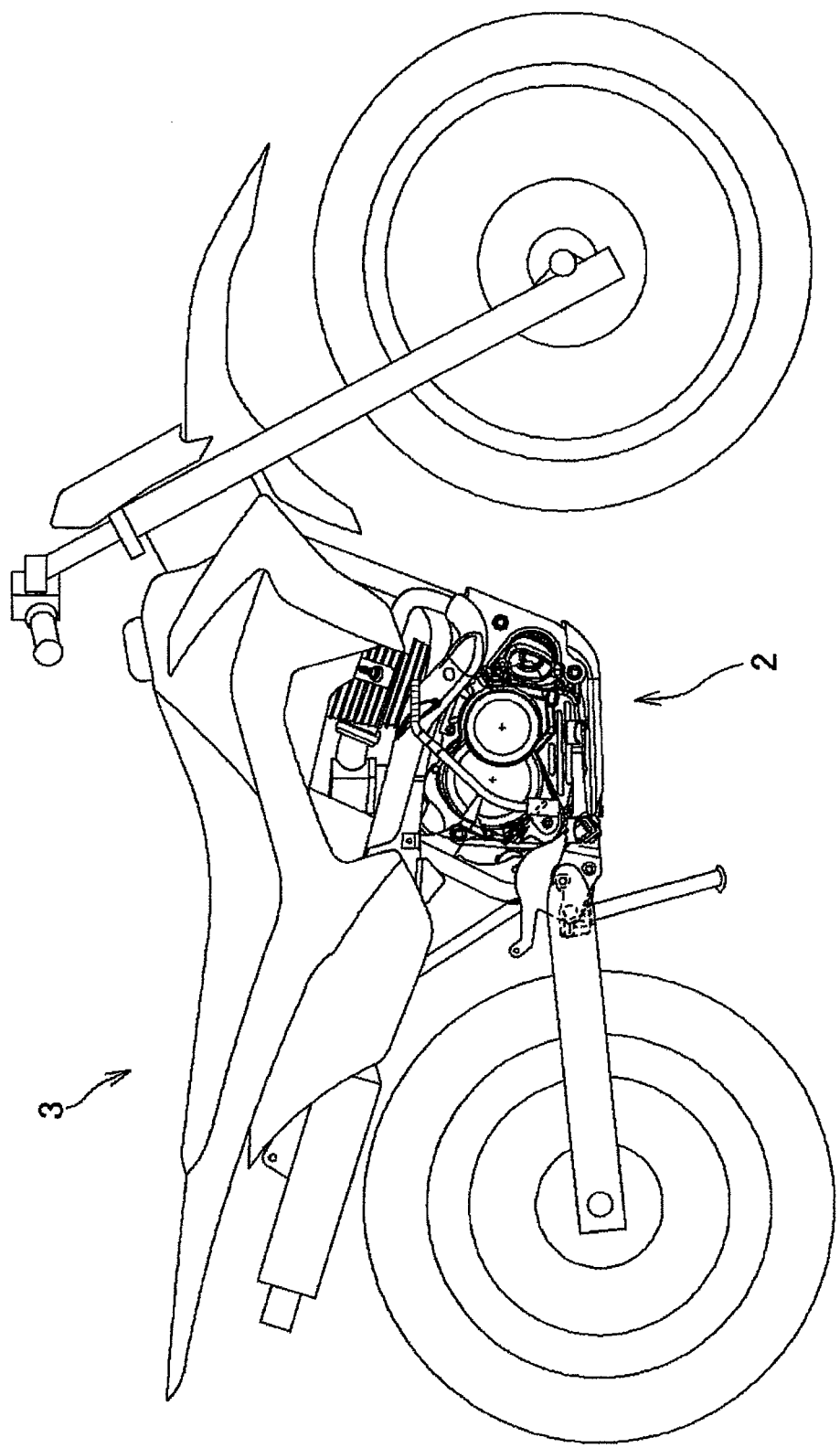
FIG. 1 is a right lateral view of a motorcycle on which an engine is mounted, the engine being attached with an oil level gauge according to an embodiment of the present invention.

FIG. 1 is a right lateral view of a motorcycle 3 on which an engine 2 is mounted. The engine 2 includes an oil level gauge according to an embodiment of the present invention.

Figure 2:
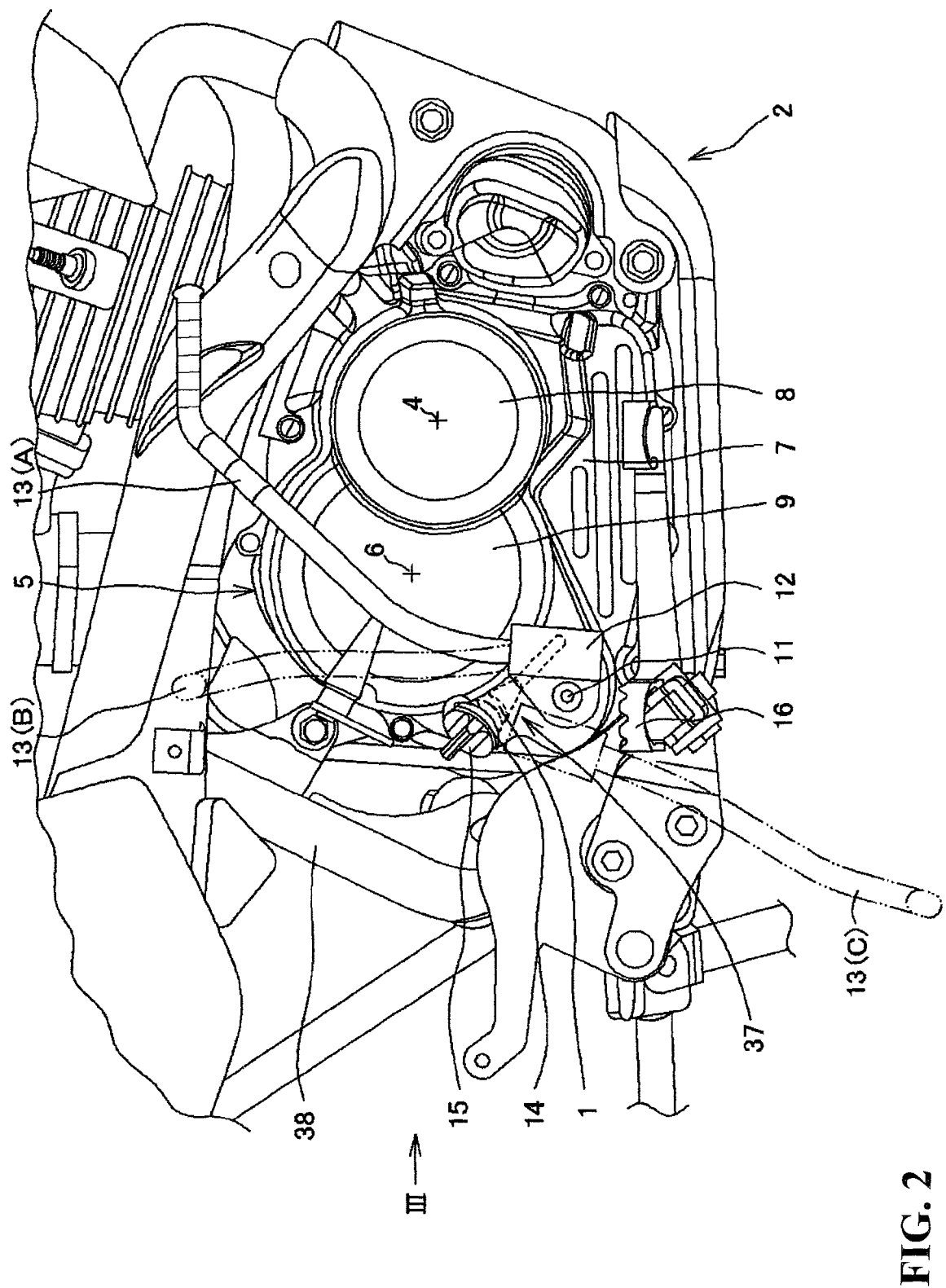
FIG. 2 is a right lateral view of the engine.

FIG. 2 is a right lateral view of the engine 2. FIG. 2 shows the position of a crankshaft 4 and the position of a main shaft 6 of a constant-mesh transmission 5. A right crankcase cover 7 has a crankshaft cover portion 8 for covering an end of the crankshaft 4 and a clutch cover portion 9 for covering the clutch located at an end of the main shaft 6. An oil level gauge 1 is disposed between a vehicle body sub-frame 38 extending vertically behind the engine 2 and the clutch cover portion 9 inclined rearwardly and downwardly. A kick starter shaft 11 is installed below the clutch cover portion 9. A kick arm 13 extends upwardly from a kick starter turning base 12 coupled to the kick starter shaft 11. An oil level gauge attachment hole 14 is provided between the clutch cover portion 9 and the kick starter turning base 12, into which the oil level gauge 1 is inserted. Usually, the external thread on the oil level gauge 1 itself is screwed to the internal thread on the oil level gauge attachment hole 14. Therefore, only a head 15 of the oil level gauge 1 is exposed to the outside. The oil level gauge attachment hole 14 also serves as an oil filling opening wherein the head 15 of the oil level gauge attachment hole 14 also serves as a cap for the oil filling opening. A footrest 16 is installed below the kick starter turning base 12.

In FIG. 2, when kick starting, the kick arm 13 turns about the turning axis of the kick starter turning base 12 from its retracted state (A) wherein the kick arm is retracted along the vehicle body toward a leftward operative state (B). The kick arm 13 turns rearwardly about the kick starter shaft 11 from this state and the engine 2 starts as the kick arm 13 turns approximately 180 degrees to a turning end state (C). The head 15 of the oil level gauge 1 is disposed at a cover concave portion 37 of the clutch cover portion 9 so as not to obstruct the turning of the kick arm 13.

Figure 3:
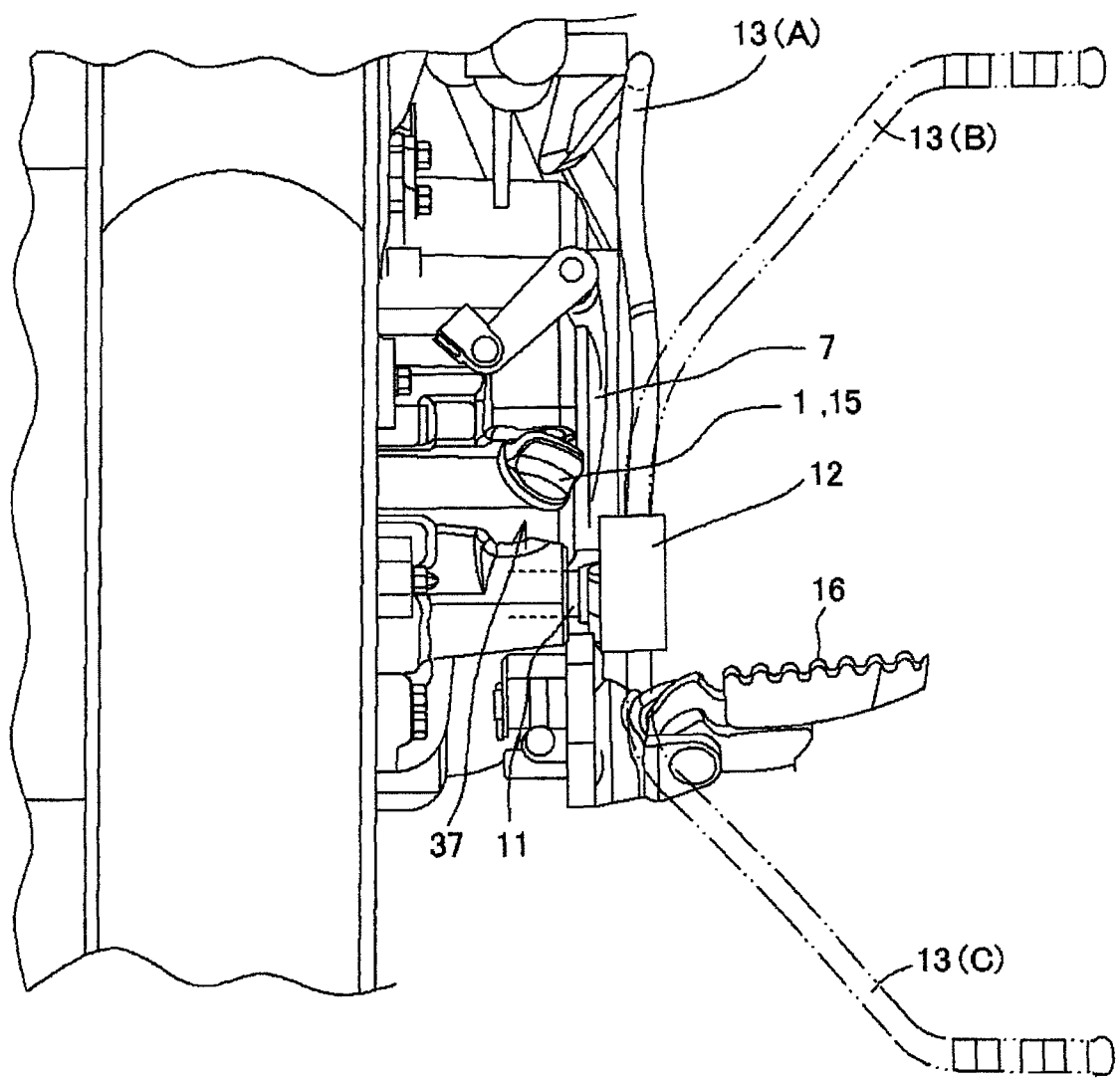
FIG. 3 is a view of the engine as viewed from arrow III in FIG. 2.

FIG. 3 is a rear view of the engine 2 as viewed from the direction indicated by arrow III in FIG. 2. The kick starter turning base 12 is secured to the end portion of the kick starter shaft 11. The kick arm 13 in the retracted state (A) extends upwardly from the kick starter turning base 12. The kick arm 13 in the retracted state (A) is turned around the turning axis of the kick starter turning base 12 toward the outward operative state (B). From this state the kick arm 13 is turned rearwardly around the kick starter shaft 11 by approximately 180 degrees until the kick arm 13 reaches the turning end state (C). It can be seen that the head 15 of the oil level gauge 1 does not obstruct the movement of the kick arm 13 when viewed from the back as well.

Figure 4:
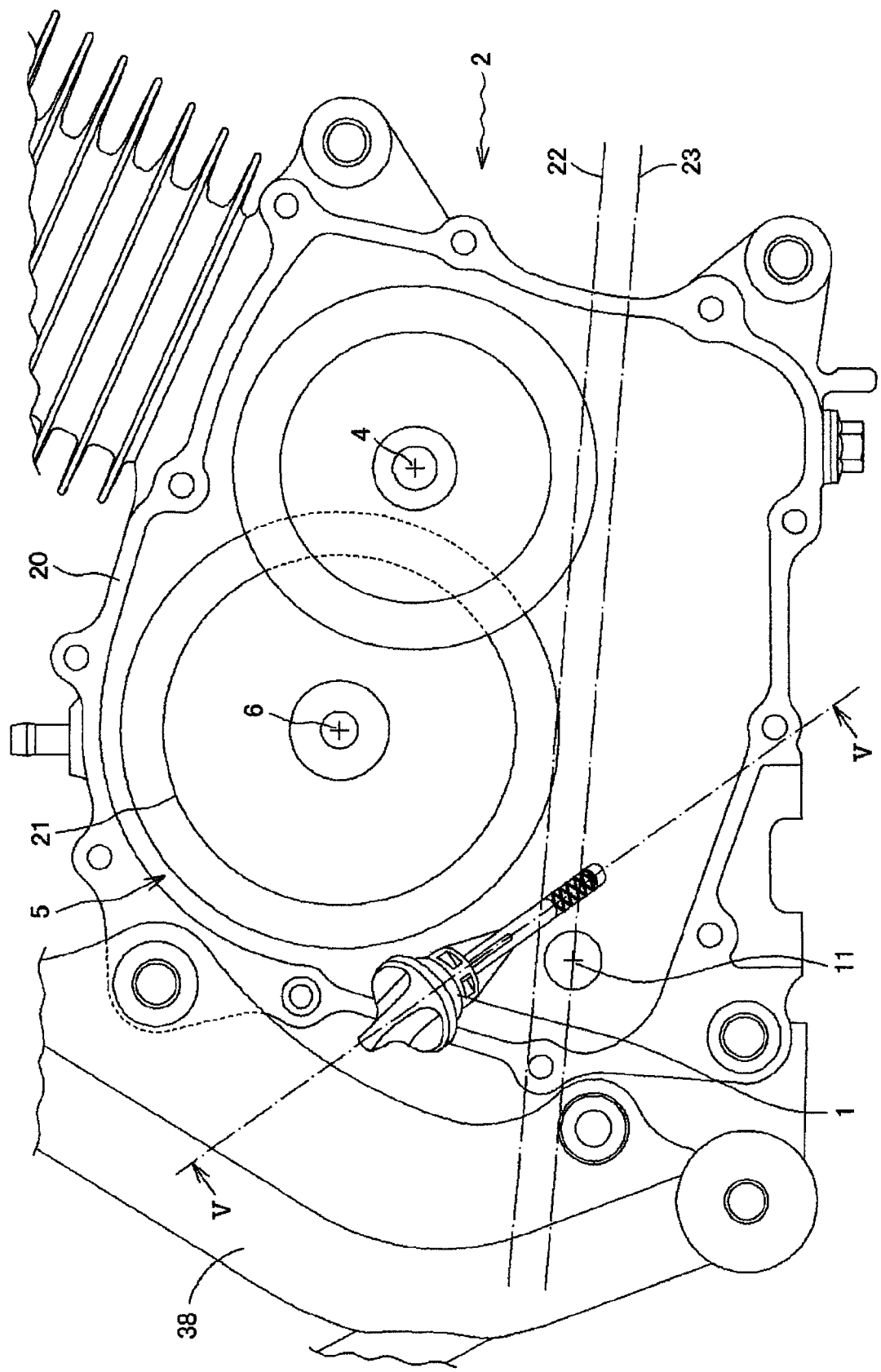
FIG. 4 is a right lateral view of the inside of a crankcase with a right crankcase cover of the engine removed.

FIG. 4 is a right lateral view of the inside of the crankcase 20 with the right crankcase cover 7 of the engine 2 removed. The oil level gauge 1 is attached to the right crankcase cover 7, but in FIG. 4 only the right crankcase cover 7 is removed and the oil level gauge 1 is illustrated as it remains at its original attachment position. A clutch 21 is mounted to the end of the main shaft 6 of the transmission 5. The kick starter shaft 11 is installed below the clutch 21. The oil level gauge 1 is located between the clutch 21 and the kick starter shaft 11. An upper limit level 22 and a lower limit level 23 of the appropriate oil level are shown in FIG. 4. Upon maintenance of the engine, oil is refilled so that the level of lubricating oil comes to the middle of the two levels.

Figure 5:
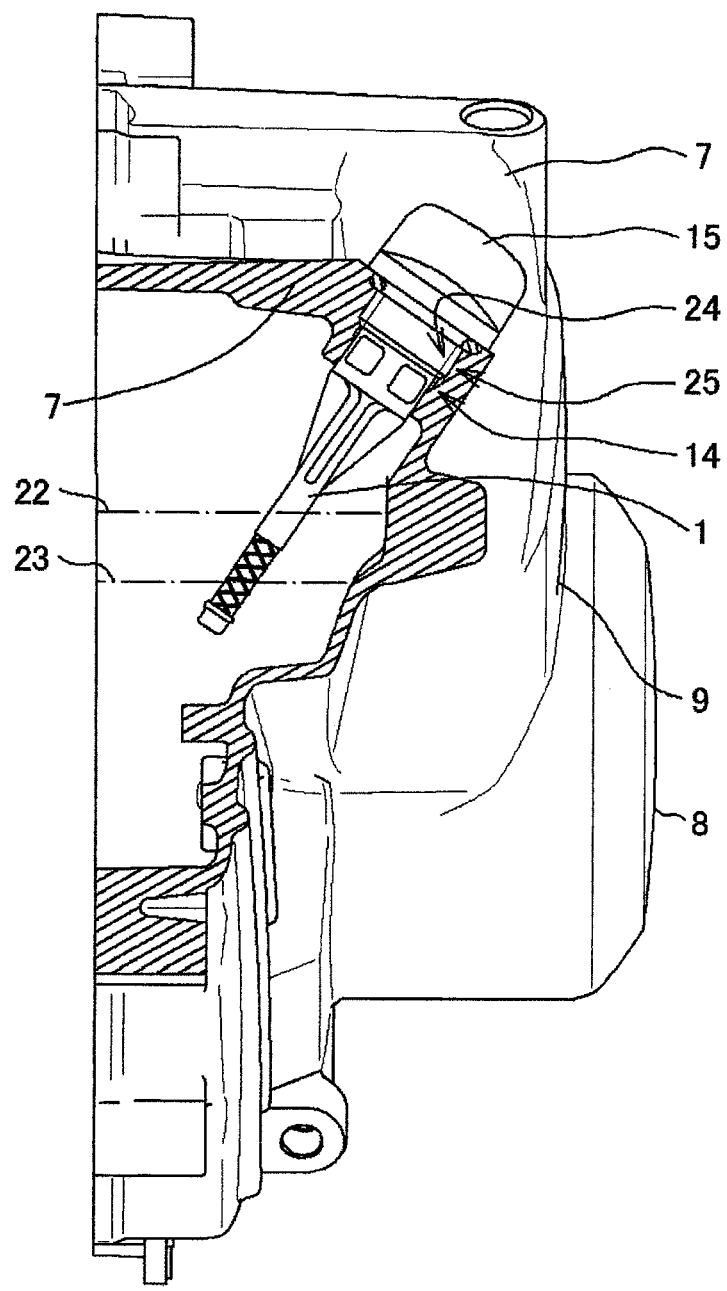
FIG. 5 is a cross-sectional view taken along line V-V in FIG. 4.

FIG. 5 is a cross-sectional view taken along line V-V of FIG. 4. The right crankcase cover 7 is provided with the oil level gauge attachment hole 14 and the oil level gauge 1 is inserted therein. The external thread on the oil level gauge 1 itself is usually screwed into the internal thread on the oil level gauge attachment hole 14. Therefore, only the head 15 of the oil level gauge 1 is exposed to the outside. As shown in FIGS. 4 and 5, the oil level gauge 1 is inserted obliquely in both the anteroposterior direction and the horizontal direction. As shown in FIG. 5, the head 15 of the oil level gauge 1 is obliquely disposed so as to be located inside the clutch cover portion 9.

Figure 6A:
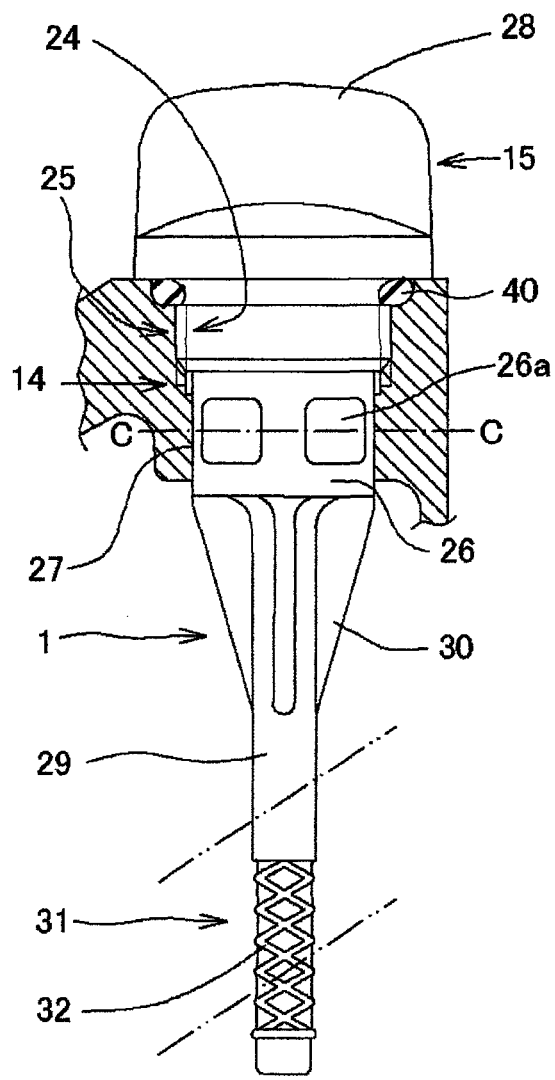
FIGS. 6(a) to 6(c) are enlarged views of the oil level gauge.
Figure 6B:
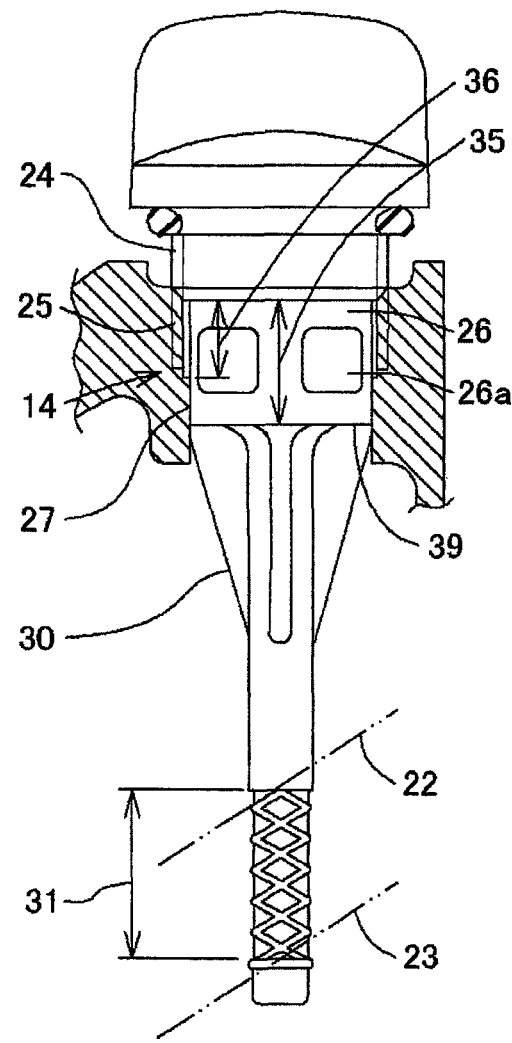
Figure 6C:
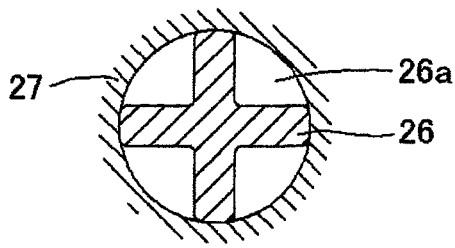

FIGS. 6(a) to 6(c) show enlarged views of the oil level gauge 1. FIG. 6(a) shows a state where the oil level gauge 1 is attached to the oil level gauge attachment hole 14 via an O-ring 40 by screwing the external thread 24 of the oil level gauge 1 itself into the internal thread 25 of the oil level gauge attachment hole 14. FIG. 6(c) is a cross-sectional view taken along line C-C of FIG. 6(a). The oil level gauge attachment hole 14 is provided with the internal thread 25. A guide hole 27 having a circular cross-section is provided below the internal thread 25. The oil level gauge 1 itself has the head 15 provided with a knob 28, and the external thread 24 is formed below the knob 28. Below the external thread 24, there is provided a columnar portion 26 continuously with the lower portion of the external thread 24 that is fitted into the guide hole 27. In addition, as shown in FIG. 6(c), the columnar portion 26 is provided with four lightening portions 26a in the circumference of its axially central portion. When the oil level gauge 1 is screwed into the attachment hole 14, the lower end of the columnar portion 26 protrudes from the lower end of the guide hole 27. In addition, even when the oil level gauge 1 is screwed in as mentioned above, the lower end of the lightening portions 26a resides above the lower end of the guide hole 27. Thus, the lightening portions will not get hooked into the guide hole so that the oil level gauge can be smoothly taken out. A rod-like portion 29 extends downwardly from the lower portion of the columnar portion 26. Triangular rib-like inclining guide portions 30 are provided on the joint portion between the columnar portion 26 and the rod-like portion 29 at four portions of the circumference thereof. These are for allowing the columnar portion 26 to be smoothly inserted into the guide hole 27. A gauge section 31 is provided at the lower end of the rod-like portion 29. A plurality of ridges 32 obliquely intersecting one another are provided on the outer circumference of the gauge section 31. The ridges 32 function to maintain an oil wet state. In addition, the gauge section 31 is a column or tube with the ridges 32 on the surface thereof. However, the form of the gauge section 31 is not limited to this. The gauge section 31 may be formed by denting the surface of the column or tube or by surface engraving.

FIG. 6(b) shows a state where, for oil level checking, the columnar portion 26 of the oil level gauge 1 is held by being fitted in the guide hole 27 that is continuous with the lower portion of the oil level gauge attachment hole 14. In FIG. 6(b), the columnar portion 26 of the oil level gauge 1 has such an axial length 35 that the lower end 39 of the columnar portion 36 exceeds a depth 36 of the internal thread 25 of the right crankcase cover 7. With this configuration, the oil level gauge 1 is guided in the appropriate direction by the guide hole 27. In addition, the oil level gauge can be prevented from being enlarged for guiding.

At the state of FIG. 6(a), when the oil level is to be detected using the oil level gauge 1, the oil level gauge 1 is unscrewed and pulled out from the oil level gauge attachment hole 14 and the oil on the tip of the gauge section 31 is wiped off. The oil level gauge 1 is again inserted into the oil level gauge attachment hole 14 but without turning it. At this time, the lower end of the external thread 24 contacts with the upper end of the internal thread 25. Therefore, the oil level gauge 1 does not enter further inwardly. This position is the oil level detection position shown in FIG. 6(b). The oil level gauge 1 is pulled out from this state and the wet state of the gauge section 31 is checked, thereby finding the amount of filled oil. In this oil level detection position, the upper rim and the lower rim of the gauge section 31 indicate the upper limit level 22 and lower limit level 23 of the appropriate oil level, respectively. This means that the oil level is appropriate when it is between the upper rim and lower rim of the gauge section 31.

As described above in details, the embodiment described above provides the following effects.

(1) The oil level gauge 1 is formed with the columnar portion 26 on the lower end side of the external thread 24. The columnar portion 26 has a predetermined length and is continuous with the external thread 24 for attachment to the right crankcase cover 7. In addition, the guide hole 27 fitted to the columnar portion 26 to restrict the position of the columnar portion 26 is provided on the lower end side of the internal thread 25 on the oil level gauge attachment hole 14 formed in the right crankcase cover 7. Therefore, enlargement of the oil level gauge 1 for its guiding can be reduced. In addition, even if the entire length of the oil level gauge 1 is short, an error in the measurement of the oil level can be reduced.

(2) As shown in FIG. 6(b), the columnar portion 26 of the oil level gauge 1 is formed to have such an axial length 35 that the lower end 39 of the columnar portion exceeds the depth 36 of the internal thread 25 of the right crankcase cover 7. Therefore, the oil level gauge 1 can be prevented from being enlarged for guiding. In addition, even if the entire length of the oil level gauge 1 is short, an error in the measurement of the oil level can be reduced.

(3) The oil level gauge 1 is provided with the inclining guide portions 30 whose width gradually increases from the gauge section 31 on its leading end toward the external thread 24. The embodiment described above employs the triangular rib-like guide portions 30, but alternatively a conical guide portion may be used. The inclining guide portions 30 ensure smooth insertion of the oil level gauge 1 into the guide hole 27, whereby the maintenance performance is improved.

(4) The gauge section 31 is cylindrical or columnar. Therefore, the gauge section 31 will have no orientation with respect to the rotational direction of the oil level gauge 1, allowing the accuracy of measurement to be improved.

(5) As shown in FIG. 2, the oil level gauge attachment hole 14 on the right crankcase cover 7 is located at a lower corner of the cover portion covering the clutch 21 inside. Since the oil level gauge 1 can be brought close to the clutch 21, it is possible to prevent the oil level gauge 1 from protruding from the right crankcase cover 7.

(6) As shown in FIG. 5, the oil level gauge 1 is set obliquely so that its outer end comes inside the vehicle-outside end of the clutch cover portion 9. While the oil level gauge 1 is disposed inwardly of the clutch cover portion 9, the accuracy of the oil level measurement can be ensured, and downsizing and improvement of the maintenance performance of the engine can be achieved.

(7) As shown in FIG. 2, the oil level gauge 1 is installed between the kick starter shaft 11 and the clutch 21 as viewed from the side of the vehicle. The oil level gauge 1 is disposed at the cover concave portion 37 near the kick starter shaft 11 such that it does not interfere with the turning trajectory of the kick arm 13. Thus, the operability of the kick arm 13 can be improved.

(8) As shown in FIG. 2, the oil level gauge 1 is disposed in the space between the sub-frame 38 of the vehicle body vertically extending at a position behind the engine 2 and the clutch cover portion 9 inclining rearwardly and downwardly. The large space provided by the inclination of the sub-frame 38 can be utilized, that allows the maintenance performance to be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An oil level gauge structure having an oil level gauge attachment hole that doubles as an oil filling opening provided in a casing of an engine and an oil level gauge for closing the attachment hole, comprising:
   a columnar portion formed on a lower end side of an external thread of the oil level gauge, the columnar portion having a predetermined length and extending from the external thread adapted to attach the oil level gauge to a casing, and a guide hole into which the columnar portion is fitted to restrict the position of the columnar portion, said guide hole is provided on a lower end side of an internal thread of the attachment hole of the casing;
   wherein the columnar portion of the oil level gauge is formed to have an axial length wherein a lower end of the columnar portion exceeds a depth of the internal thread of the casing.

2. The oil level gauge structure according to claim 1, wherein the oil level gauge is provided with an inclining guide portion having a width gradually increasing from the gauge section located at a leading end thereof to the external thread.

3. The oil level gauge structure according to claim 2, wherein the gauge section is cylindrical or columnar.

4. The oil level gauge structure according to claim 2, wherein the oil level gauge attachment hole in the casing is located at a lower corner portion of a cover member for covering an internal rotating body.

5. The oil level gauge structure according to claim 4, wherein the casing is a clutch cover portion for covering a side of a clutch as the internal rotating body and the oil level gauge is disposed obliquely and having an outer end located inside the vehicle-outside end of the clutch cover portion.

6. The oil level gauge structure according to claim 4, wherein the oil level gauge is installed between a kick starter shaft and the rotating body as viewed from a side of the vehicle.

7. The oil level gauge structure according to claim 5, wherein the oil level gauge is installed between a kick starter shaft and the rotating body as viewed from a side of the vehicle.

8. The oil level gauge structure according to claim 6, wherein the oil level gauge is disposed in a space between a sub-frame vertically extending behind the engine and the clutch cover portion tilting rearwardly and downwardly.

9. The oil level gauge structure according to claim 7, wherein the oil level gauge is disposed in a space between a sub-frame vertically extending behind the engine and the clutch cover portion tilting rearwardly and downwardly.

10. An oil level gauge structure comprising:
an oil level gauge attachment hole;
an oil level gauge for closing the oil level gauge attachment hole, said oil level gauge attachment hole also providing a filling opening for filing oil into a casing of an engine;
said oil level gauge including:
an externally threaded section for mounting relative to an internally threaded section of the attachment hole for securing the oil level gauge to the casing of the engine;
a columnar portion formed on a lower end side of the externally threaded section of the oil level gauge, said columnar portion having a predetermined length extending from the externally threaded section of the oil level gauge; and
a guide hole formed in the casing of the engine for receiving the columnar portion wherein the columnar portion is fitted to restrict the position of the columnar portion, said guide hole is positioned on a lower end side of the internally threaded section of the attachment hole of the casing;
wherein the columnar portion of the oil level gauge is formed to have an axial length wherein a lower end of the columnar portion exceeds a depth of the internal thread of the casing.

11. The oil level gauge structure according to claim 10, wherein the oil level gauge is provided with an inclining guide portion having a width gradually increasing from the gauge section located at a leading end thereof to the external thread.

12. The oil level gauge structure according to claim 11, wherein the gauge section is cylindrical or columnar.

13. The oil level gauge structure according to claim 11, wherein the oil level gauge attachment hole in the casing is located at a lower corner portion of a cover member for covering an internal rotating body.

14. The oil level gauge structure according to claim 13, wherein the casing is a clutch cover portion for covering a side of a clutch as the internal rotating body and the oil level gauge is disposed obliquely and having an outer end located inside the vehicle-outside end of the clutch cover portion.

15. The oil level gauge structure according to claim 13, wherein the oil level gauge is installed between a kick starter shaft and the rotating body as viewed from a side of the vehicle.

16. The oil level gauge structure according to claim 14, wherein the oil level gauge is installed between a kick starter shaft and the rotating body as viewed from a side of the vehicle.

17. The oil level gauge structure according to claim 15, wherein the oil level gauge is disposed in a space between a sub-frame vertically extending behind the engine and the clutch cover portion tilting rearwardly and downwardly.

18. The oil level gauge structure according to claim 16, wherein the oil level gauge is disposed in a space between a sub-frame vertically extending behind the engine and the clutch cover portion tilting rearwardly and downwardly.

* * * * *